(12) United States Patent
Pichilingue

(10) Patent No.: US 11,025,188 B2
(45) Date of Patent: Jun. 1, 2021

(54) SYSTEMS AND METHODS FOR DETERMINING PROPER PHASE ROTATION IN DOWNHOLE LINEAR MOTORS

(71) Applicant: Baker Hughes Incorporated, Houston, TX (US)

(72) Inventor: Renato L. Pichilingue, Houston, TX (US)

(73) Assignee: BAKER HUGHES, a GE company, LLC, Houston, TX (US)

(*) Notice: Subject to any disclaimer, the term of this patent is extended or adjusted under 35 U.S.C. 154(b) by 1272 days.

(21) Appl. No.: 15/149,461

(22) Filed: May 9, 2016

(65) Prior Publication Data

US 2016/0369604 A1 Dec. 22, 2016

Related U.S. Application Data

(60) Provisional application No. 62/181,299, filed on Jun. 18, 2015.

(51) Int. Cl.
| | |
|---|---|
| *F04B 47/06* | (2006.01) |
| *H02P 25/064* | (2016.01) |
| *F04B 49/20* | (2006.01) |
| *F04B 17/03* | (2006.01) |
| *H02P 6/12* | (2006.01) |

(52) U.S. Cl.
CPC ............ *H02P 25/064* (2016.02); *F04B 17/03* (2013.01); *F04B 47/06* (2013.01); *F04B 49/20* (2013.01); *H02P 6/12* (2013.01)

(58) Field of Classification Search
CPC .......... H02P 25/064; H02P 6/12; F04B 49/20; F04B 47/06; F04B 17/03; F04B 2203/04

USPC .............................. 417/44.11; 318/125, 687
See application file for complete search history.

(56) References Cited

U.S. PATENT DOCUMENTS

| | | | | | |
|---|---|---|---|---|---|
| 3,951,209 | A | * | 4/1976 | Gibbs | E21B 47/007 166/250.15 |
| 3,976,919 | A | * | 8/1976 | Vandevier | G01R 29/18 361/96 |
| 4,015,469 | A | * | 4/1977 | Womack | E21B 47/007 73/152.61 |
| 4,667,264 | A | * | 5/1987 | Yamazaki | H02H 11/004 307/127 |
| 4,687,054 | A | | 8/1987 | Russell | |
| 5,015,162 | A | | 5/1991 | Heppner | |
| 5,049,046 | A | | 9/1991 | Escue | |
| 5,252,031 | A | * | 10/1993 | Gibbs | E21B 47/007 417/53 |
| 5,252,043 | A | | 10/1993 | Bolding | |
| 5,362,206 | A | | 11/1994 | Westerman | |

(Continued)

*Primary Examiner* — Peter J Bertheaud
*Assistant Examiner* — Dnyanesh G Kasture
(74) *Attorney, Agent, or Firm* — Sprinkle IP Law Group

(57) ABSTRACT

Systems and methods for determining proper phase rotation in a linear motor that may be used in an ESP system, where the phase rotations associated with power and return strokes are initially unknown. The method includes providing power to the motor for multiple cycles and monitoring the load (e.g., by monitoring current drawn by the motor) on the motor to determine in which direction (phase rotation) the load on the motor increases. This direction corresponds to the power stroke of the motor. The direction of increasing load is then associated with the power stroke and the motor is operated normally.

14 Claims, 5 Drawing Sheets

(56) References Cited

U.S. PATENT DOCUMENTS

| | | | |
|---|---|---|---|
| 5,796,565 A * | 8/1998 | Verkhovskiy | H02H 7/097 |
| | | | 361/29 |
| 6,176,682 B1 | 1/2001 | Mills | |
| 6,283,720 B1 | 9/2001 | Kotke | |
| 6,534,947 B2 | 3/2003 | Johnson | |
| 7,153,290 B2 | 12/2006 | Wakabayashi | |
| 7,513,752 B2 | 4/2009 | Boone | |
| 8,287,246 B2 * | 10/2012 | Plitt | F04B 47/06 |
| | | | 417/44.11 |
| 8,602,754 B2 * | 12/2013 | Atherton | F04D 15/0094 |
| | | | 417/423.3 |
| 8,698,447 B2 * | 4/2014 | Lumsden | H02P 6/182 |
| | | | 318/812 |
| 9,476,425 B2 * | 10/2016 | Atherton | E21B 47/008 |
| 2003/0026702 A1 * | 2/2003 | Yoo | F04B 35/045 |
| | | | 417/44.11 |
| 2005/0095140 A1 | 5/2005 | Boren | |
| 2006/0257264 A1 * | 11/2006 | Kim | F04B 35/045 |
| | | | 417/44.1 |
| 2009/0097987 A1 * | 4/2009 | Sung | F04B 35/045 |
| | | | 417/44.11 |
| 2010/0316503 A1 | 12/2010 | Knudsen | |
| 2011/0033314 A1 | 2/2011 | Plitt | |
| 2012/0292051 A1 * | 11/2012 | Wetzel | E21B 33/072 |
| | | | 166/385 |

\* cited by examiner

SYSTEMS AND METHODS FOR DETERMINING PROPER PHASE ROTATION IN DOWNHOLE LINEAR MOTORS

CROSS-REFERENCE TO RELATED APPLICATIONS

This application claims the benefit of U.S. Provisional Patent Application 62/181,299, filed Jun. 18, 2015 by Renato L. Pichilingue, which is incorporated by reference as if set forth herein in its entirety.

BACKGROUND

Field of the Invention

The invention relates generally to downhole tools for use in wells, and more particularly to means for determining the proper phase rotation for power that is supplied to a downhole linear motor.

Related Art

In the production of oil from wells, it is often necessary to use an artificial lift system to maintain the flow of oil. The artificial lift system commonly includes an electric submersible pump (ESP) that is positioned downhole in a producing region of the well. The ESP has a motor that receives electrical power from equipment at the surface of the well. The received power drives the motor, which in turn drives a pump to lift the oil out of the well.

ESP motors commonly use rotary designs in which a rotor is coaxially positioned within a stator and rotates within the stator. The shaft of the rotor is coupled to a pump, and drives a shaft of the pump to turn impellers within the body of the pump. The impellers force the oil through the pump and out of the well. While rotary motors are typically used, it is also possible to use a linear motor. Instead of a rotor, the linear motor has a mover that moves in a linear, reciprocating motion. The mover drives a plunger-type pump to force oil out of the well.

In order to properly control a linear motor, it is desirable to know the electrical position of the mover within the stator. Linear motors may use several sensors (e.g., Hall-effect sensors) to determine the electrical position and absolute position of the mover. The signals from these sensors are provided to a control system. Then, based upon the position of the mover, the drive delivers electrical power to run the motor.

An ESP using a linear motor typically operates on three-phase power. Each phase is carried by a separate conductor, and is typically shifted by 120 degrees from the other phases. An electrical drive system at the surface of the well generates the three-phase drive signal that is supplied to the motor, which in turn drives the pump. When the system is installed, it is commonly necessary to make various connections (e.g., cable splices) between the electrical conductors that convey the electrical power to the motor. It is not unusual for mistakes to be made in these connections, resulting in electrical connections between the electrical drive system and pump motor that are incorrect. More specifically, two or more of the conductors may be switched. Such misconnection of the conductors may also occur when maintenance is performed on the electrical drive system or the cabling.

Because the phasing of a three-phase electrical signal is reversed (e.g., A-B-C becomes C-B-A) when any two of the three wires are switched, misconnection of these wires can result in the pump motor being driven in a direction which is opposite the intended direction. In other words, when the electrical drive system produces a drive signal with phasing that is intended to drive the motor in the forward direction, it actually drives the motor in the reverse direction. In the case of a linear motor, the drive's output signal is intended to drive the upstroke/downstroke of the motor, so if the phase rotation is reversed, the mover will be driven upward when it is intended to be driven downward, and downward when it is intended to be driven upward. While this may still result in some fluid being produced from the well, it typically is not as efficient as if the proper phasing is used. Additionally, if the motor is intended to be driven in a particular manner on upward or downward strokes (e.g., faster on the downward stroke), this will actually occur on the opposite stroke.

It would therefore be desirable to provide improved means for determining the phasing at the output of the drive that is associated with a linear motor's upstroke and downstroke, and for utilizing this information to generate signals to drive the linear motor.

SUMMARY OF THE INVENTION

This disclosure is directed to systems and methods for determining the proper phase rotation for power that is supplied to a downhole linear motor that solve one or more of the problems discussed above. One particular embodiment is a method for determining proper phase rotation in a linear motor, such as may be used in an ESP system, where the phase rotations associated with power and return strokes are initially unknown. The method includes providing power to a linear motor and thereby driving the motor for multiple cycles. Each cycle includes a stroke in which the motor's mover travels in a first direction and a stroke in a second, opposite direction. The load on the motor (the force generated by the motor) is monitored during each of the cycles, and it is determined whether the load on the motor increases from cycle to cycle during the strokes in the first direction, or the second direction. This may be done from cycle to cycle as averages for the strokes, or at specific points in the strokes. Because the load is proportional to the current drawn by the motor, the load on the motor may be determined by monitoring the current drawn by the motor. If the load on the motor increases during the strokes in the first direction, this indicates that this stroke is forcing the weight of the increasing column of fluid out of the well. The first direction is therefore associated with the power stroke and the second direction is associated with the return stroke. If, on the other hand, the load on the motor remains substantially constant during the strokes in the first direction, and increases during the strokes in the second direction, the first direction is associated with the return stroke and the second direction is associated with the power stroke. This method may be used in a startup phase of operation. For instance, after an ESP system has been installed in a well, or after repairs have been made to the system, it may be necessary to start the motor without knowing whether the phases of the power cable have been correctly connected to the motor. Because these connections are not known, associating the directions with the respective power and return strokes may consist of associating the phase rotations of the generated power with the power and return strokes. After the directions (phase rotations) are associated with the power and return strokes, monitoring of the load on the motor can be discontinued, and the system may proceed to run the motor normally.

An alternative embodiment comprises an apparatus for determining proper phase rotation in a linear motor. The apparatus comprises a controller of an electric drive system for the motor. In a startup phase of operation, the controller is configured to control the electric drive to provide power to the motor. The power drives the motor for some number of cycles, where each cycle includes a stroke in a first direction and a stroke in a second, opposite direction. The number of cycles may be predetermined. The controller monitors the load on the motor during each stroke of each cycle, such as by monitoring the current drawn by the motor (which is proportional to the load). The controller then determines which of the first and second directions corresponds to an increasing load on the motor and which of the directions corresponds to substantially constant load. The controller may compare loads for each successive cycle, first and last cycles, etc., and may compare average loads for the respective strokes, loads at specific points in the strokes, and so forth. Whichever of the directions corresponds to an increasing load over the multiple cycles is the direction of the power stroke. The controller therefore associates this direction with the power stroke and associates the opposite direction with the return stroke. The association may be made in a variety of ways, such as by storing corresponding in a memory of the controller. After the controller determines which of the directions or phase rotations correspond to the power and return strokes, the controller may control the electric drive to operate the motor normally.

Another alternative embodiment comprises a system that includes an electric drive, an ESP and a power cable that couples a linear motor of the ESP to the electric drive. In a startup phase of operation, the electric drive provides power to the motor for some number of cycles, where each cycle includes a stroke in a first direction and a stroke in a second, opposite direction. Each direction corresponds to a different phase rotation. The electric drive monitors the load on the motor during each stroke of each cycle (e.g., by monitoring the current drawn by the motor) and determines which of the first and second directions (and phase rotations) corresponds to an increasing load on the motor. Strokes in the opposite direction (and opposite phase rotation) should experience a substantially constant load. The electric drive compares the loads for multiple cycles to determine which direction and phases rotation corresponds to an increasing load over the multiple cycles. This is the direction (and phase rotation) of the power stroke, so the electric drive associates this direction with the power stroke and associates the opposite direction with the return stroke. The association may be made in a variety of ways, such as by storing corresponding in a memory in the electric drive. After the electric drive determines which of the directions or phase rotations correspond to the power and return strokes, the drive may operate the motor normally.

Numerous other embodiments are also possible.

BRIEF DESCRIPTION OF THE DRAWINGS

Other objects and advantages of the invention may become apparent upon reading the following detailed description and upon reference to the accompanying drawings.

Figure 1:
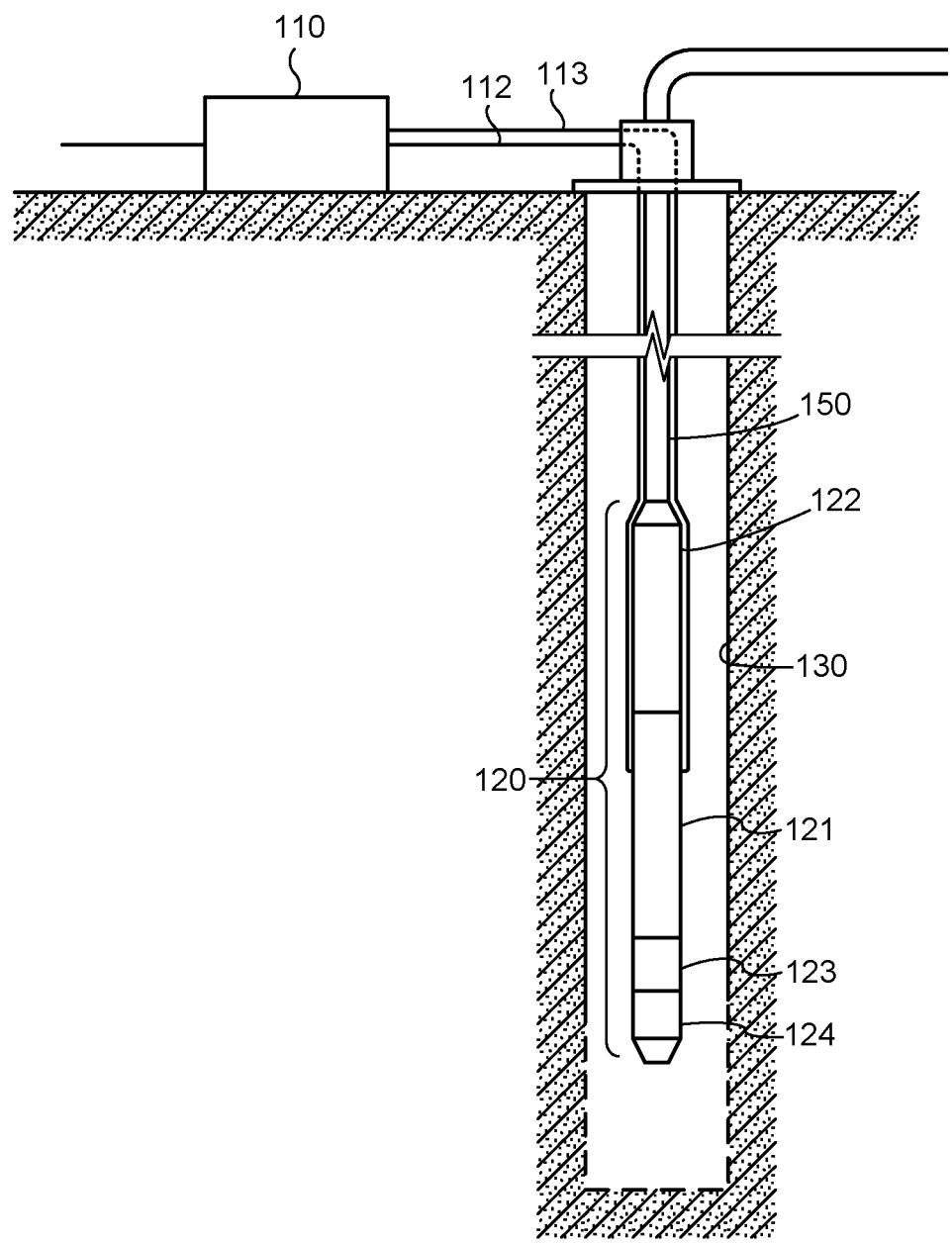
FIG. 1 is a diagram illustrating an exemplary pump system in accordance with one embodiment.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as defined by the appended claims. Further, the drawings may not be to scale, and may exaggerate one or more components in order to facilitate an understanding of the various features described herein.

DETAILED DESCRIPTION OF EXEMPLARY EMBODIMENTS

One or more embodiments of the invention are described below. It should be noted that these and any other embodiments described below are exemplary and are intended to be illustrative of the invention rather than limiting.

As described herein, various embodiments of the invention comprise systems and methods for determining the phase voltage rotation (A-B-C or C-B-A) of an electric drive system that is required to drive a linear motor in a desired direction. ("Direction" as used here refers to the direction of motion of the mover which, in a vertically oriented motor is either upward or downward.)

Generally speaking, in the present systems and methods, a controller of an electric drive system generates an output voltage having a known phase rotation, and this output voltage is provided to a linear motor to drive the mover in a first direction. It does not matter whether the output phase rotation drives the upstroke or downstroke of the motor. At the end of the stroke, the phase rotation is reversed to drive the mover in the opposite direction. This is repeated for several cycles, where each cycle includes a stroke in each direction. As each stroke is performed, the controller for the drive monitors the current drawn by the motor. The current is an indication of the amount of force that is generated by the motor, which in turn corresponds to the load on the motor. In one direction, the amount of current drawn by the motor will increase from one cycle to the next. This direction corresponds to the power stroke of the motor, which requires more force as a column of fluid is generated in the production tubing. In the other direction, the amount of current drawn by the motor will remain essentially constant. This direction corresponds to the return stroke, which requires the same amount of force to draw fluid into the pump on each cycle. Once the power stroke and return stroke have been identified from the cycle-to-cycle differences in current, the corresponding phase rotations are associated with the respective strokes, and the motor is operated normally.

Referring to FIG. 1, a diagram illustrating an exemplary pump system in accordance with one embodiment of the present invention is shown. A wellbore 130 is drilled into an oil-bearing geological structure and is cased. The casing within wellbore 130 is perforated in a producing region of the well to allow oil to flow from the formation into the well. Pump system 120 is positioned in the producing region of the well. Pump system 120 is coupled to production tubing 150, through which the system pumps oil out of the well. A control system 110 is positioned at the surface of the well.

Control system 110 is coupled to pump 120 by power cable 112 and a set of electrical data lines 113 that may carry various types of sensed data and control information between the downhole pump system and the surface control equipment. Power cable 112 and electrical lines 113 run down the wellbore along tubing string 150.

Pump 120 includes an electric motor section 121 and a pump section 122. In this embodiment, an expansion chamber 123 and a gauge package 124 are included in the system. (Pump system 120 may include various other components which will not be described in detail here because they are well known in the art and are not important to a discussion of the invention.) Motor section 121 receives power from control system 110 and drives pump section 122, which pumps the oil through the production tubing and out of the well.

In this embodiment, motor section 121 is a linear electric motor. Control system 110 receives AC (alternating current) input power from an external source such as a generator (not shown in the figure), rectifies the AC input power, converting it to DC (direct current) voltage of a specific value as determined by the controller which is then used to produce three-phase AC output power which is suitable to drive the linear motor. The output power generated by control system 110 is dependent in part upon the electrical position of the mover within the stator of the linear motor. Electrical position sensors in the motor sense the position of the mover and communicate this information via electrical lines 113 to control system 110 so that that electrical currents are properly and timely commutated (as will be discussed in more detail below). The output power generated by control system 110 is provided to pump system 120 via power cable 112.

Figure 2:
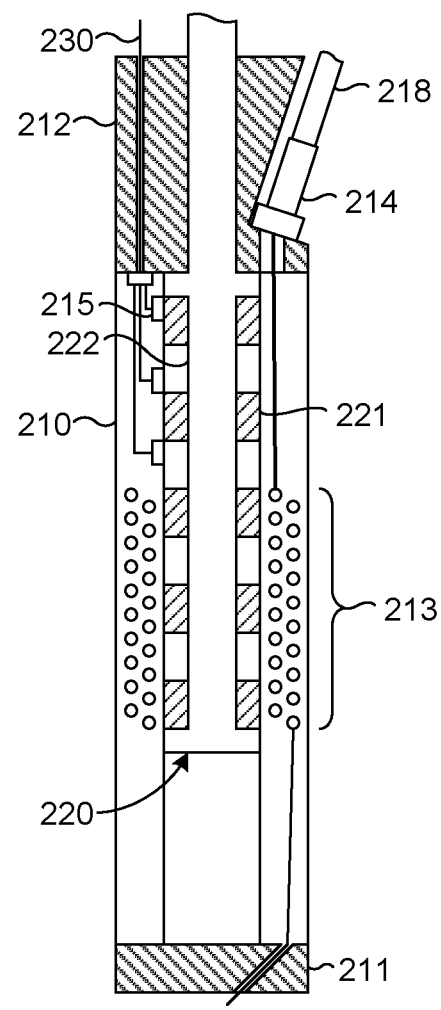
FIG. 2 is a diagram illustrating an exemplary linear motor in accordance with one embodiment which would be suitable for use in the pump system of FIG. 1.

Referring to FIG. 2, a diagram illustrating an exemplary linear motor which would be suitable for use in the pump system of FIG. 1 is shown. The linear motor has a cylindrical stator 210 which has a bore in its center. A base 211 is connected to the lower end of stator 210 to enclose the lower end of the bore, and a head 212 is connected to the upper end of the stator. Motor head 212 has an aperture therethrough to allow the shaft 222 of the mover 220 to extend to the pump. In this embodiment, the pump is configured to draw fluid into the pump on the upstroke and expel the fluid on the downstroke. In other words, the downstroke is the power stroke and the upstroke is the return stroke.

Stator 210 has a set of windings 213 of magnet wire. Windings 213 include multiple separate coils of wire, forming multiple poles within the stator. The ends of the windings are coupled (e.g., via a pothead connector 214) to the conductors of the power cable 218. Although the power cable has separate conductors that carry the three phase power to the motor, the conductors are not depicted separately in the figure for purposes of simplicity and clarity. Similarly, the coils of magnet wire are not separately depicted. The coils may have various different configurations, but are collectively represented as component 213 in the figure.

The windings are alternately energized by the current received through the power cable to generate magnetic fields within the stator. These magnetic fields interact with permanent magnets 221 on the shaft 222 of mover 220, causing mover 220 to move up and down within the motor. The waveform of the signal provided by the drive via the power cable (in this case a three-phase signal) is controlled to drive mover 220 in a reciprocating motion within the bore of stator 210. Stator 210 incorporates a set of Hall-effect sensors 215 to monitor the electrical position of mover 220 within stator 210. The outputs of Hall-effect sensors 215 are transmitted to the controller and can be used to determine absolute position. They may be transmitted as distinct signals, or they may be combined to form one or more composite signals. The mover may also be coupled to an absolute encoder of some type, and data from this encoder may be transmitted to the controller. The controller then tracks the motor position based on the received signals.

Figure 3A:
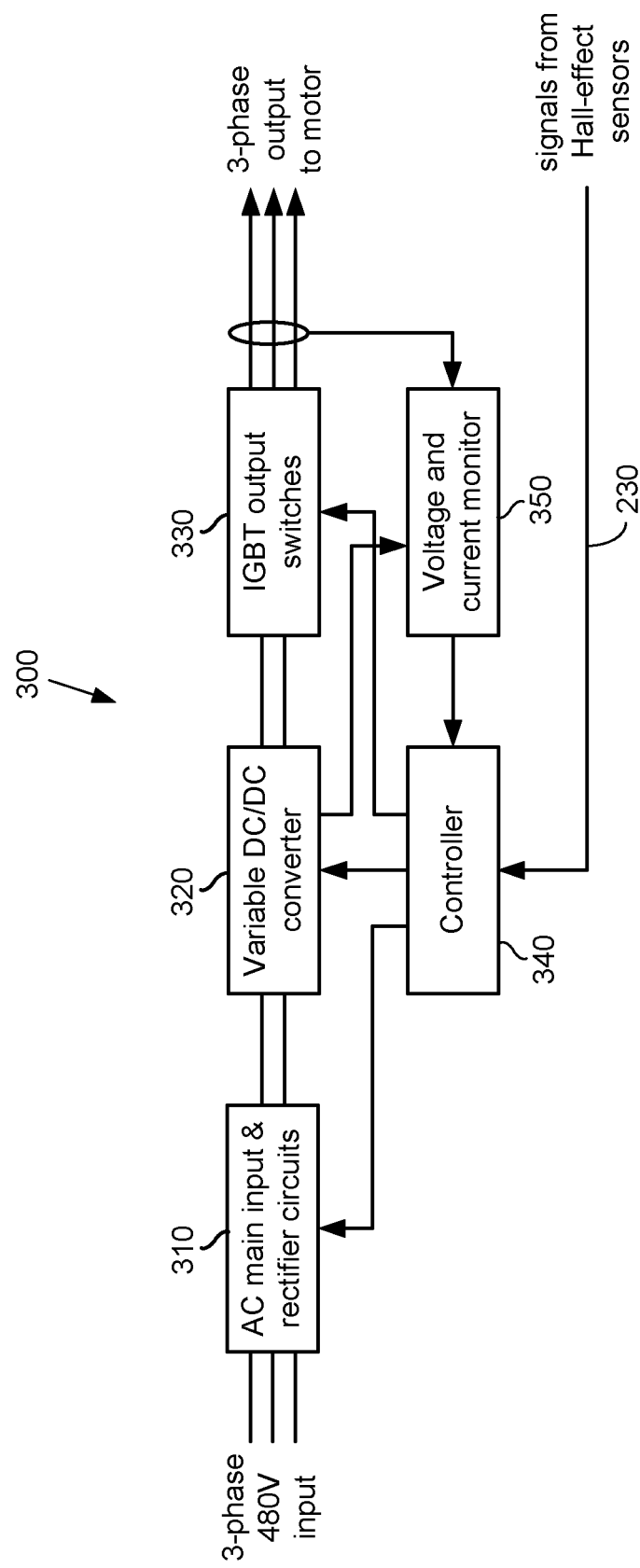
FIGS. 3A and 3B are functional block diagrams illustrating the structure of control systems for a linear motors in accordance with two exemplary embodiments.

Referring to FIG. 3A, a functional block diagram illustrating the structure of a control system for a linear motor in one embodiment is shown. The control system is incorporated into a drive system (e.g., 110) for the linear motor. The drive system receives AC input power from an external source and generates three-phase output power that is provided to the linear motor to move the pump. The drive system also receives position information from the linear motor and uses this information when generating the three-phase power for the motor.

As depicted in FIG. 3A, drive system 300 has input and rectifier circuitry 310 that receives AC input power from the external power source. The input power may be, for example, 480V, three-phase power. Circuitry 310 converts the received AC power to DC power at a voltage determined by the line value and provides this power to a first DC bus. The DC power on the first DC bus is provided to a variable DC-DC converter 320 that outputs DC power at a desired voltage to a second DC bus. The voltage of the DC power output by DC-DC converter 320 can be adjusted within a range from 0V to the voltage on the first DC bus, as determined by a voltage adjustment signal received from motor controller 340. The DC power on the second DC bus is input to an inverter 330 which produces three-phase output power at a desired voltage and frequency as determined by the controller. The output power produced by inverter 330 is transmitted to the downhole linear motor via a power cable.

The power output by inverter 330 is monitored by voltage monitor 350. Voltage monitor 350 provides a signal indicating the voltage output by inverter 330 as an input to motor controller 340. Motor controller 340 also receives position information from the downhole linear motor. In one embodiment, this position information consists of the signals generated by the Hall-effect sensors as described above in connection with FIG. 2. Motor controller 340 uses the received position information to determine the position and speed of the mover within the linear motor. Based upon this position and speed information, as well as the information received from voltage monitor 350, controller 340 controls inverter 330 to generate the appropriate output signal.

In one embodiment, motor controller 340 may control the switching of insulated gate bipolar transistors (IGBT's) in inverter 330 to generate a three-phase, 6-step waveform. The three phases of the drive's output may be identified as phases A, B and C. As noted above, although the drive system outputs are known, it is not uncommon for misconnection of the conductors between the drive system and the downhole motor to occur. Consequently, although the outputs of the drive system are intended to be provided to respective inputs of the downhole motor (e.g., output A to input A', output B to input B', and output C to input C'), it is not known whether this is actually the case. The drive system is therefore configured to identify the phasing at its output that will provide the proper input phasing at the motor.

It is assumed for the purposes of this disclosure that the phase differences between the three phases of the drive unit's output signals are substantially equal. When any two of the phases are switched, the effect is to reverse the order of the phases. For instance, if the phases on lines A, B and C occur in the order A-B-C, switching the signals on any two of the lines will result in the phase order C-B-A. It is therefore assumed that any output signal generated by the drive unit will have one of these two orders (which may be referred to herein as phasings or phase rotations).

In this embodiment, the controller is configured to generate an output that drives the motor for several cycles, alternating between the two phase rotations to cause the motor to perform multiple power strokes and return strokes. The controller monitors the current drawn by the motor on each stroke and, based on changes in the current drawn by the motor in each direction, determines which phase rotation drives the power stroke, and which drives the return stroke. With the phase rotations now identified and associated with the respective strokes, the controller proceeds with normal operation of the motor.

Figure 3B:
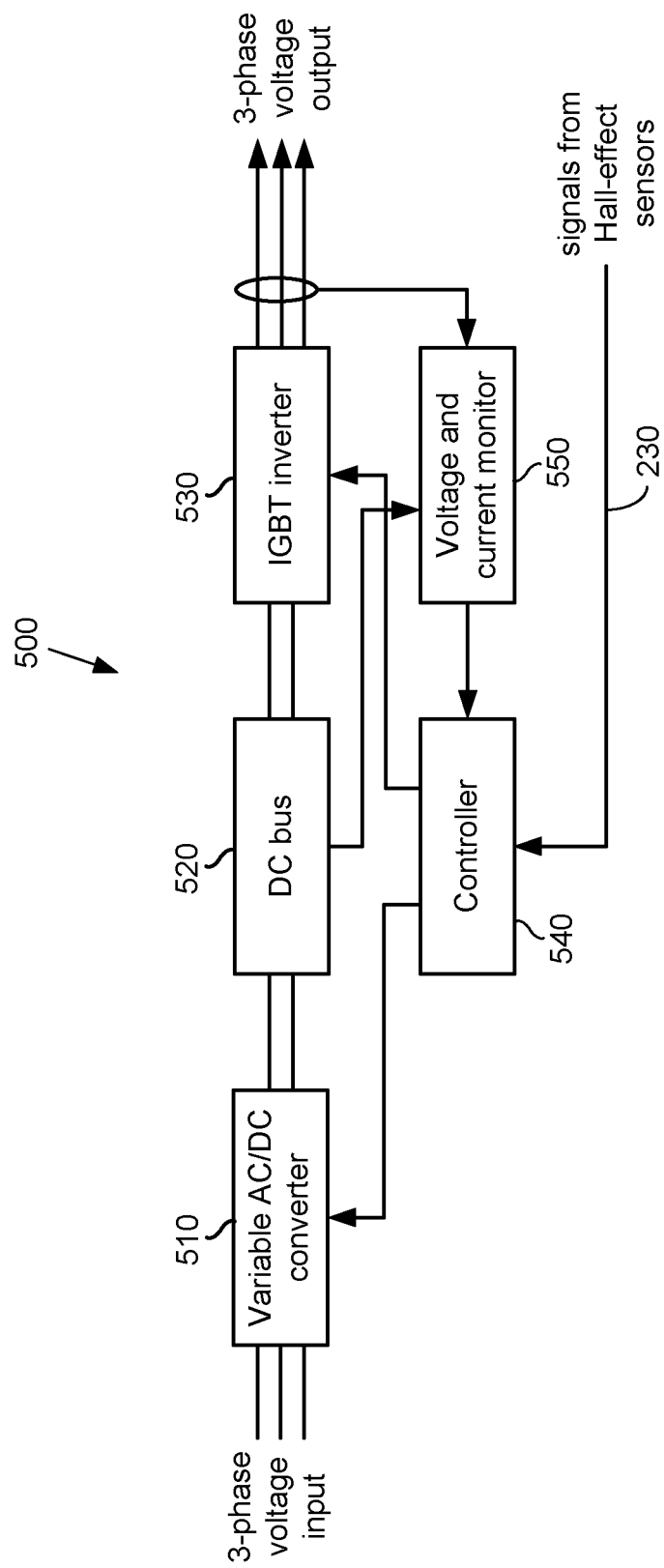

Referring to FIG. 3B, a functional block diagram illustrating an alternative structure of a control system for a linear motor is shown. The control system is incorporated into a drive system (e.g., 110) for the linear motor. The drive system again receives AC input power from an external source and generates three-phase output power for the linear motor. The drive system uses feedback on its voltage and current output, as well as position information from the motor, to control generation of the three-phase power for the motor.

As depicted in FIG. 3B, drive system 500 has a variable AC/DC converter that converts the received AC power to DC. The DC power is provided to DC bus 520. The DC power on bus 520 is used by IGBT inverter 530 to produce three-phase output power at a desired voltage and frequency as determined by controller 540. The output power produced by IGBT inverter 530 is transmitted to the downhole linear motor via a power cable.

The power output by IGBT inverter 530 is monitored by voltage and current monitor 550. Monitor 550 provides voltage and current information to motor controller 540. Motor controller 540 also receives position information from the position sensors in the downhole linear motor. Controller 540 uses the received position information to determine the position and speed of the mover within the linear motor. Based upon the information received by controller 540, IGBT inverter 530 is controlled to generate the appropriate output signal. The methods described above (e.g., in connection with FIG. 4) are implemented in controller 540 in a manner similar to controller 340 of FIG. 3.

Figure 4:
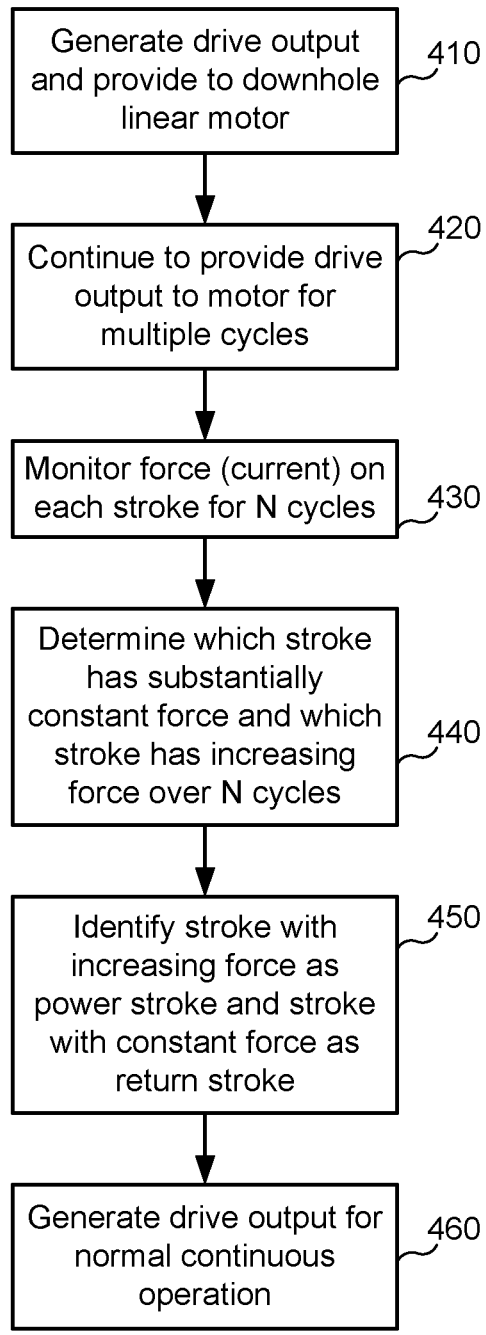
FIG. 4 is a flow diagram illustrating a method for determining whether a phase rotation is associated with a power stroke or return stroke of a linear motor in accordance with one embodiment.

Referring to FIG. 4, a flow diagram illustrating a method in accordance with one embodiment is shown. In this embodiment, an electric drive which is coupled to a downhole electric linear motor generates an output voltage in a startup phase of operation that is provided to a downhole linear motor. The output alternates between a first phase rotation (e.g., A-B-C), and a second phase rotation (e.g., C-B-A). The first phase rotation drives the motor's mover in one direction, and the second phase rotation drives the mover in the opposite direction. Since, however, it is not known whether the power conductors have been properly connected, it is not initially known which phase rotation drives the motor's power stroke, and which drives the return stroke.

The drive is controlled so that it continues to provide its output power to the downhole linear motor for two or more cycles, where each cycle includes an upward stroke and a downward stroke (420). The specific number of cycles (N) may vary from one embodiment to another. As the power is provided to the motor, the drive monitors the current drawn by the motor (430). The current is an indicator of the force that is generated by the motor. The drive can therefore effectively monitor the amount of force required for each stroke in each direction.

On the motor's power stroke, the motor drives the pump to force oil upward through the production tubing. When the motor first starts, the system has not yet built up a column of fluid in the production tubing, so the pump requires less force to push the fluid through the tubing. As the motor continues to operate, the height of the column of fluid increases, so more force is required to push the fluid upward through the production tubing. Consequently, the amount of current drawn on the power stroke will increase from a lower current at startup to a higher current when the system reaches normal operation. On the motor's return stroke, on the other hand, the amount of current drawn by the motor will remain essentially constant. This is because, on the return stroke, the pump only has to draw oil from the surrounding formation into the pump's barrel, rather than push the fluid upward out of the well. The force required to draw the fluid into the pump is substantially the same at startup as it is during normal operation of the pump, so the current drawn by the motor on successive return strokes will not change significantly.

After the current drawn by the motor has been monitored for several cycles, the current for each stroke can be compared from one cycle to another. This comparison reveals which of the strokes has drawn a substantially constant current for each cycle, and which of the strokes has drawn an increasing amount of current for each successive cycle (440). It should be noted that the amount by which the current changes from cycle to cycle will decrease, so that it levels out and becomes substantially constant after some number of cycles. The stroke that has the increasing current is then identified as the power stroke (the downward stroke in the above example), and the stroke that has the substantially constant current is identified as the return stroke (the upward stroke in the example) (450). When the power and return strokes have been identified, the drive associates each stroke with the respective phase rotation which produced that stroke. For example, if the A-B-C phase rotation produced the stroke for which the current increased over several cycles, this phase rotation is associated with the power stroke (the forward direction), and C-B-A phase rotation is associated with the return stroke (the reverse direction). The association of the phase rotation with the power stroke may be made in the controller in various ways, such as by storing data in a memory, configuring the controller's programming, etc. After it has been determined which of the phase rotations is associated with the power and return strokes, the drive controls the output power for normal, continuous operation of the motor (460). "Normal" operation refers to generating and providing signals that drive the mover alternately through repeating cycles of the power and return strokes to produce fluids from the well. The power output characteristics intended to be provided on the power and return strokes may be different, and after determining which of the phase rotations is associated with each of the power and return strokes, the characteristics intended to be associated with each one will be provided on the appropriate stroke.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the described embodiments. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the described embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the present disclosure.

What is claimed is:

1. An apparatus comprising:
a controller of an electric drive system for a linear motor, wherein in a startup phase of operation, the controller is configured to:
control the electric drive system which provides power to the linear motor, wherein the power drives the motor for a plurality of cycles, wherein each cycle includes a stroke in which a mover of the motor moves in a first direction and a stroke in which the mover moves in a second direction which is opposite the first direction;
monitor a load on the motor during the plurality of cycles;
determine, for each of the first and second directions, whether the load on the motor during the strokes in the corresponding direction increases over the plurality of cycles;
if the load on the motor during the strokes in the first direction increases and the load on the motor during the strokes in the second direction remains substantially constant, associate the first direction with a power stroke and associating the second direction with a return stroke;
if the load on the motor during the strokes in the second direction increases and the load on the motor during the strokes in the first direction remains substantially constant, associate the second direction with the power stroke and associating the first direction with the return stroke;
provide power to the linear motor having respective power output characteristics associated with the power stroke and return stroke.

2. The apparatus of claim 1, wherein the controller controls the electric drive system to provide power having a first phase rotation which causes the mover to move in the first direction and power having a second phase rotation which causes the mover to move in the second direction; wherein if the controller determines that the load on the motor during the strokes in the first direction increases and the load on the motor during the strokes in the second direction remains substantially constant, the controller associates the first phase rotation with the power stroke and associates the second phase rotation with the return stroke; wherein if the controller determines that the load on the motor during the strokes in the second direction increases and the load on the motor during the strokes in the first direction remains substantially constant, the controller associates the second phase rotation with the power stroke and associates the first phase rotation with the return stroke.

3. The apparatus of claim 1, wherein the controller determines the load on the motor during the strokes in each of the first and second directions by determining a current drawn by the motor during the strokes in each of the first and second directions, wherein the load on the motor is proportional to the current drawn by the motor.

4. The apparatus of claim 3, wherein, for each of the first and second directions, the controller determines whether the current drawn by the motor during the strokes in the corresponding direction increases over the plurality of cycles by comparing the current for the stroke in the corresponding direction in each successive one of the plurality of cycles.

5. The apparatus of claim 1, wherein the controller initially causes the electric drive system to provide no power to the motor, and then causes the electric drive system to provide power to the motor in a startup phase of operation, wherein the controller monitors the load on the motor for a predetermined number of cycles during the startup phase, and wherein after the controller monitors the load on the motor for the predetermined number of cycles and associates each of the first and second directions with the corresponding one of the power and return strokes in the startup phase, the controller controls the electric drive system to operate the motor normally.

6. A system comprising:
an electric submersible pump (ESP) system installed in a well, wherein the ESP system includes a linear motor;
an electric drive system positioned at the surface of the well; and
one or more electrical cables coupled between the electric drive system and the ESP system, wherein the one or more electrical cables carry power from the electric drive system to the ESP system;
wherein the electric drive system includes a controller for the linear motor of the ESP system;
wherein in a startup phase of operation, the electric drive system is configured to
provide power to the linear motor, wherein the power drives the motor for a plurality of cycles, wherein each cycle includes a stroke in which a mover of the motor moves in a first direction and a stroke in which the mover moves in a second direction which is opposite the first direction,
monitor a load on the motor during the plurality of cycles,
determine, for each of the first and second directions, whether the load on the motor during the strokes in the corresponding direction increases over the plurality of cycles,
if the load on the motor during the strokes in the first direction increases and the load on the motor during the strokes in the second direction remains substantially constant, associate the first direction with a power stroke and associating the second direction with a return stroke,
if the load on the motor during the strokes in the second direction increases and the load on the motor during the strokes in the first direction remains substantially constant, associate the second direction with the power stroke and associating the first direction with the return stroke; and
provide power to the linear motor having respective power output characteristics associated with the power stroke and return stroke.

7. The system of claim 6, wherein the electric drive system generates power having a first phase rotation which causes the mover to move in the first direction and power having a second phase rotation which causes the mover to move in the second direction; wherein if the electric drive system determines that the load on the motor during the strokes in the first direction increases and the load on the motor during the strokes in the second direction remains substantially constant, the electric drive system associates the first phase rotation with the power stroke and associates the second phase rotation with the return stroke; wherein if the electric drive system determines that the load on the motor during the strokes in the second direction increases and the load on the motor during the strokes in the first direction remains substantially constant, the electric drive system associates the second phase rotation with the power stroke and associates the first phase rotation with the return stroke.

8. The system of claim 6, wherein the electric drive system determines the load on the motor during the strokes in each of the first and second directions by determining a current drawn by the motor during the strokes in each of the first and second directions, wherein the load on the motor is proportional to the current drawn by the motor.

9. The system of claim 8, wherein, for each of the first and second directions, the electric drive system determines whether the current drawn by the motor during the strokes in the corresponding direction increases over the plurality of cycles by comparing the current for the stroke in the corresponding direction in each successive one of the plurality of cycles.

10. The system of claim 6, wherein the electric drive system initially provides no power to the motor, and provides power to the motor in a startup phase of operation, wherein the electric drive system monitors the load on the motor for a predetermined number of cycles during the startup phase, and wherein after the electric drive system monitors the load on the motor for the predetermined number of cycles and associates each of the first and second directions is associated with the corresponding one of the power and return strokes in the startup phase, the electric drive system operates the motor normally.

11. An apparatus comprising:
a controller of an electric drive system for a linear motor, wherein in a startup phase of operation, the controller is configured to:
control the electric drive system which provides power to the linear motor, wherein the power drives the motor for a plurality of cycles, wherein each cycle includes a stroke in which a mover of the motor moves in a first direction and a stroke in which the mover moves in a second direction which is opposite the first direction;
determine, for each of a first plurality of strokes in the first direction and for each of a second plurality of strokes in the second direction, a corresponding load on the motor;
determine whether the load on the motor corresponding to successive ones of the first plurality of strokes increases;
determine whether the load on the motor corresponding to successive ones of the second plurality of strokes increases;
if the load on the motor corresponding to successive ones of the first plurality of strokes increases and the load on the motor corresponding to successive ones of the second plurality of strokes remains substantially constant, associate the first direction with a power stroke and associate the second direction with a return stroke;
if the load on the motor corresponding to successive ones of the second plurality of strokes increases and the load on the motor corresponding to successive ones of the first plurality of strokes remains substantially constant, associate the second direction with a power stroke and associate the first direction with a return stroke; and
provide power to the linear motor having respective power output characteristics associated with the power stroke and return stroke.

12. The apparatus of claim 11, wherein the controller is configured to determine whether the load on the motor corresponding to the successive ones of the strokes increases by comparing the loads corresponding to the successive ones of the strokes.

13. The apparatus of claim 11, wherein the controller is configured to, after associating one of the first and second directions with the power stroke and associating one of the first and second directions with the return stroke, provide power with a first set of power output characteristics on the power stroke and provide power with a second, different set of power output characteristics on the return stroke.

14. The apparatus of claim 11, wherein associating each of the first and second directions with the corresponding one of the power stroke and the return stroke comprises storing corresponding data in a memory coupled to the controller.

\* \* \* \* \*